(12) United States Patent
Kolossovsky

(10) Patent No.: US 9,613,348 B2
(45) Date of Patent: Apr. 4, 2017

(54) METHODS, SYSTEMS, AND MEDIA FOR CONDUCTING TRANSACTIONS USING TRANSACTION CODES

(71) Applicant: Vega LLC, Hoboken, NJ (US)

(72) Inventor: Dmitri Kolossovsky, Hoboken, NJ (US)

(*) Notice: Subject to any disclaimer, the term of this patent is extended or adjusted under 35 U.S.C. 154(b) by 0 days.

(21) Appl. No.: 14/282,408

(22) Filed: May 20, 2014

(65) Prior Publication Data

US 2014/0339304 A1    Nov. 20, 2014

Related U.S. Application Data

(60) Provisional application No. 61/825,462, filed on May 20, 2013.

(51) Int. Cl.
| | |
|---|---|
| G06Q 20/00 | (2012.01) |
| G06Q 20/26 | (2012.01) |
| G06Q 20/38 | (2012.01) |
| G06Q 20/42 | (2012.01) |

(52) U.S. Cl.
CPC ......... *G06Q 20/26* (2013.01); *G06Q 20/385* (2013.01); *G06Q 20/425* (2013.01)

(58) Field of Classification Search
USPC ...................................... 705/17.64; 235/379
See application file for complete search history.

(56) References Cited

U.S. PATENT DOCUMENTS

| | | | | |
|---|---|---|---|---|
| 2005/0177517 | A1* | 8/2005 | Leung et al. ............... | 705/64 |
| 2009/0254485 | A1* | 10/2009 | Baentsch et al. .......... | 705/71 |
| 2011/0022484 | A1* | 1/2011 | Smith et al. ............... | 705/17 |
| 2012/0303425 | A1* | 11/2012 | Katzin ................ | G06Q 20/027 |
| | | | | 705/14.4 |
| 2014/0310117 | A1* | 10/2014 | Moshal ............ | G06F 17/30879 |
| | | | | 705/23 |

* cited by examiner

*Primary Examiner* — Daniel Hess
(74) *Attorney, Agent, or Firm* — Byrne Poh LLP

(57) ABSTRACT

In accordance with some embodiments of the disclosed subject matter, methods for conducting a transaction using transaction codes are provided, the methods comprising: obtaining information about a trade item associated with the transaction; generating, using a hardware processor, a sale transaction code on a first user device; transmitting the sale transaction code to the first user device; receiving a first input of the sale transaction code on a second user device; generating a confirmation transaction code in response to receiving the first input, wherein the confirmation transaction code includes information about a second user account associated with the second user device; transmitting the confirmation transaction code to the second user device; receiving a second input of the confirmation transaction code on the first user device; and settling the transaction using the second user account in response to receiving the second input.

12 Claims, 20 Drawing Sheets

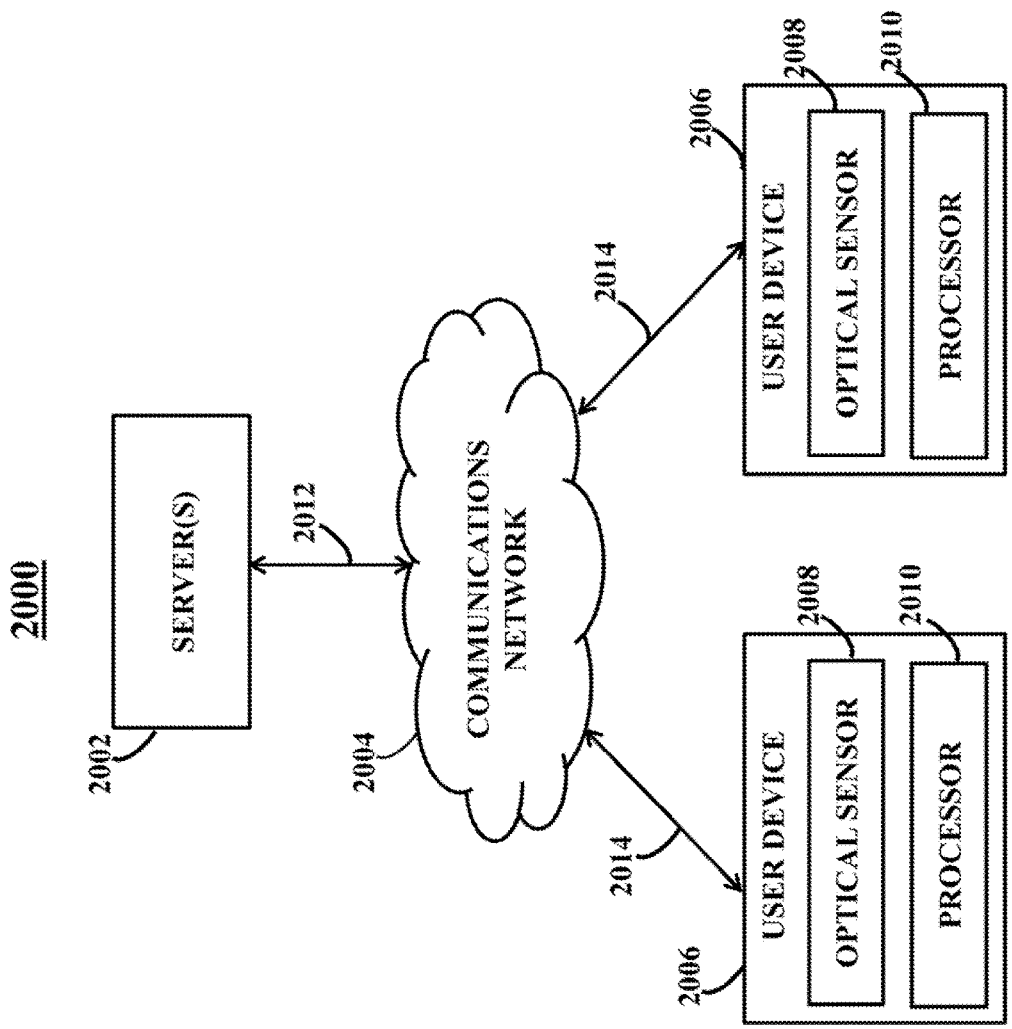

METHODS, SYSTEMS, AND MEDIA FOR CONDUCTING TRANSACTIONS USING TRANSACTION CODES

CROSS-REFERENCE TO RELATED APPLICATION

This application claims the benefit of U.S. Provisional Patent Application No. 61/825,462, filed May 20, 2013, which is hereby incorporated by reference herein in its entirety.

TECHNICAL FIELD

Methods, systems, and media for conducting transactions using transaction codes are provided.

BACKGROUND

There are many current approaches to conducting commercial transactions, such as business-to-consumer (B2C) transactions, business-to-business (B2B) transactions, consumer-to-consumer (C2C) transactions, etc. However, conventional approaches for conducting commercial transactions suffer from many shortcomings. For example, a user may have to purchase specialized equipment in order to make a commercial transaction using a conventional system. As another example, a conventional system for conducting commercial transactions may only allow funds transfer between accounts in a particular financial institution (e.g., a bank). As yet another example, a conventional system for conducting commercial transactions may only provide a user with the ability to conduct a particular type of commercial transactions (e.g., B2C transactions).

Therefore, new mechanisms for conducting commercial transactions are desirable.

SUMMARY

In accordance with some embodiments of the disclosed subject matter, methods, systems, and media for conducting a transaction using transaction codes are provided.

In accordance with some embodiments of the disclosed subject matter, methods for conducting a transaction using transaction codes are provided, the methods comprising: obtaining information about a trade item associated with the transaction; generating, using a hardware processor, a sale transaction code on a first user device, wherein the sale transaction code includes the information about the trade item and information about a first user account associated with the first user device; transmitting the sale transaction code to the first user device; receiving a first input of the sale transaction code on a second user device; generating a confirmation transaction code in response to receiving the first input, wherein the confirmation transaction code includes information about a second user account associated with the second user device; transmitting the confirmation transaction code to the second user device; receiving a second input of the confirmation transaction code on the first user device; and settling the transaction using the second user account in response to receiving the second input.

In accordance with some embodiments of the disclosed subject matter, systems for conducting a transaction using transaction codes are provided, the systems comprising: at least one hardware processor that is configured to: obtain information about a trade item associated with the transaction; generate a sale transaction code on a first user device, wherein the sale transaction code includes the information about the trade item and information about a first user account associated with the first user device; transmit the sale transaction code to the first user device; receive a first input of the sale transaction code on a second user device; generate a confirmation transaction code in response to receiving the first input, wherein the confirmation transaction code includes information about a second user account associated with the second user device; transmit the confirmation transaction code to the second user device; receive a second input of the confirmation transaction code on the first user device; and settle the transaction using the second user account in response to receiving the second input.

In accordance with some embodiments of the disclosed subject matter, non-transitory media containing computer-executable instructions that, when executed by a processor, cause the processor to perform a method for conducting a transaction using transaction codes are provided. In some embodiments, the method comprises: obtaining information about a trade item associated with the transaction; generating a sale transaction code on a first user device, wherein the sale transaction code includes the information about the trade item and information about a first user account associated with the first user device; transmitting the sale transaction code to the first user device; receiving a first input of the sale transaction code on a second user device; generating a confirmation transaction code in response to receiving the first input, wherein the confirmation transaction code includes information about a second user account associated with the second user device; transmitting the confirmation transaction code to the second user device; receiving a second input of the confirmation transaction code on the first user device; and settling the transaction using the second user account in response to receiving the second input.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIG. 20 shows a generalized block diagram of an example of a system for conducting transactions using transaction codes in accordance with some embodiments of the disclosed subject matter.

DETAILED DESCRIPTION

In accordance with some embodiments, mechanisms for conducting transactions using transaction codes are provided. Generally speaking, these mechanisms can include a transaction code payment (TCP) application that can allow users of the application to establish TCP accounts, initiate a transaction, generate a sale transaction code for the transaction, verify information about the transaction, generate a confirmation transaction code for the transaction, and settle the transaction.

The mechanisms can be used in a variety of applications. For example, these mechanisms can be used to conduct a variety of commercial transactions, such as business-to-consumer (B2C) transactions, business-to-business (B2B) transactions, consumer-to-consumer (C2C) transactions, etc. In a more particular example, the mechanisms can be used for transfers among multiple banks (e.g., through Automated Clearing House (ACH) network). In another more particular example, the mechanisms can be used to transfer funds between two banking accounts to settle transactions. As another example, the mechanisms can be used to conduct transactions utilizing suitable user devices, such as mobile phones, tablet computers, laptop computers, etc. In some embodiments, for example, the user devices do not have to comprise a NEAR FIELD COMMUNICATION (NFC) chip. As yet another example, the mechanisms can enable law enforcement to trace payments, transactions, etc. made by particular individuals and/or companies.

These and other features for conducting transactions using transaction codes are described in connection with FIGS. 1-20.

Figure 1:
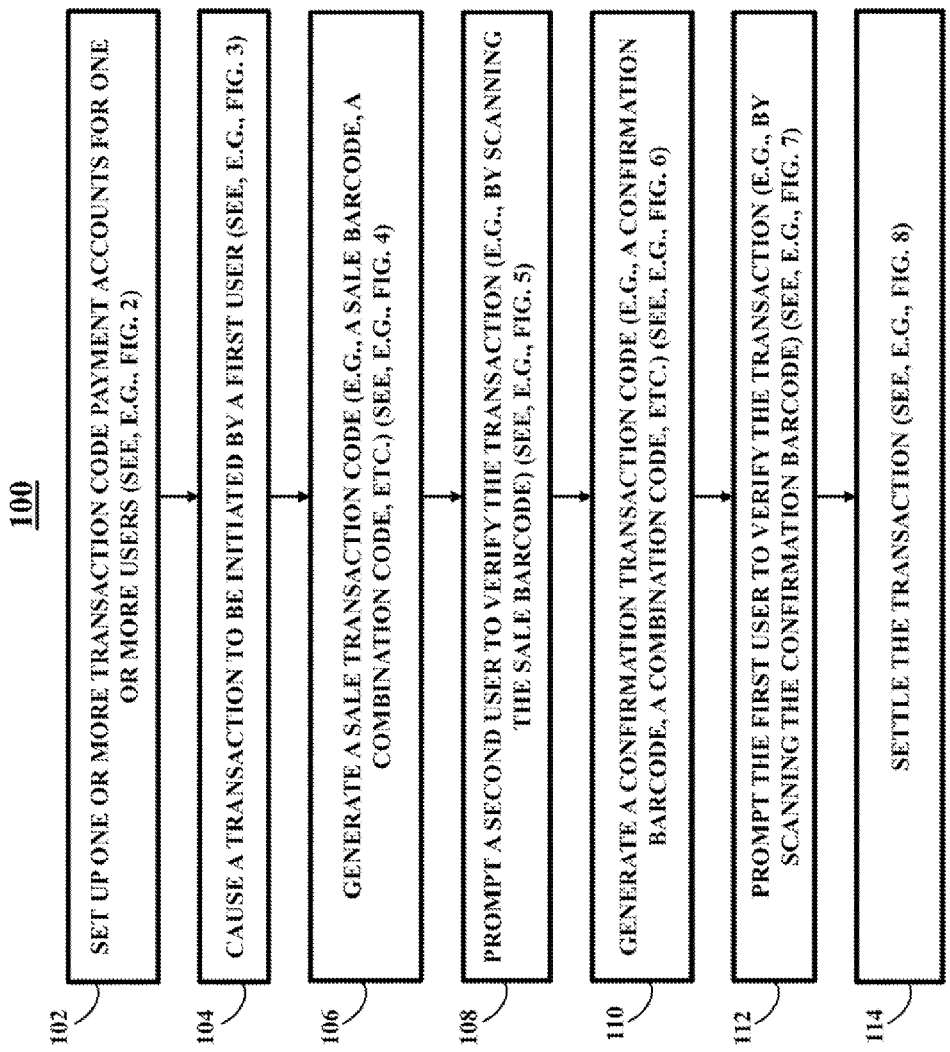
FIG. 1 shows an example of a process for conducting transactions using transaction codes in accordance with some embodiments of the disclosed subject matter.

Turning to FIG. 1, an example 100 of a process for conducting transactions using transaction codes is provided. As shown, process 100 can start by setting up one or more transaction code payment (TCP) accounts for one or more users at 102. The TCP accounts can be set up in any suitable manner. For example, an account application form can be presented to a user to allow the user to provide information about the user and the TCP account to be established. Any suitable account application form can be presented to the user in any suitable way to allow the user to set up a TCP account. For example, the account application form can be an online application that can be electronically presented to the user through Internet, a paper form that can be physically presented to the user, etc. As another example, the user can be requested to create a user ID, a password, and any other suitable user credentials by filling in the account application form.

Figure 2:
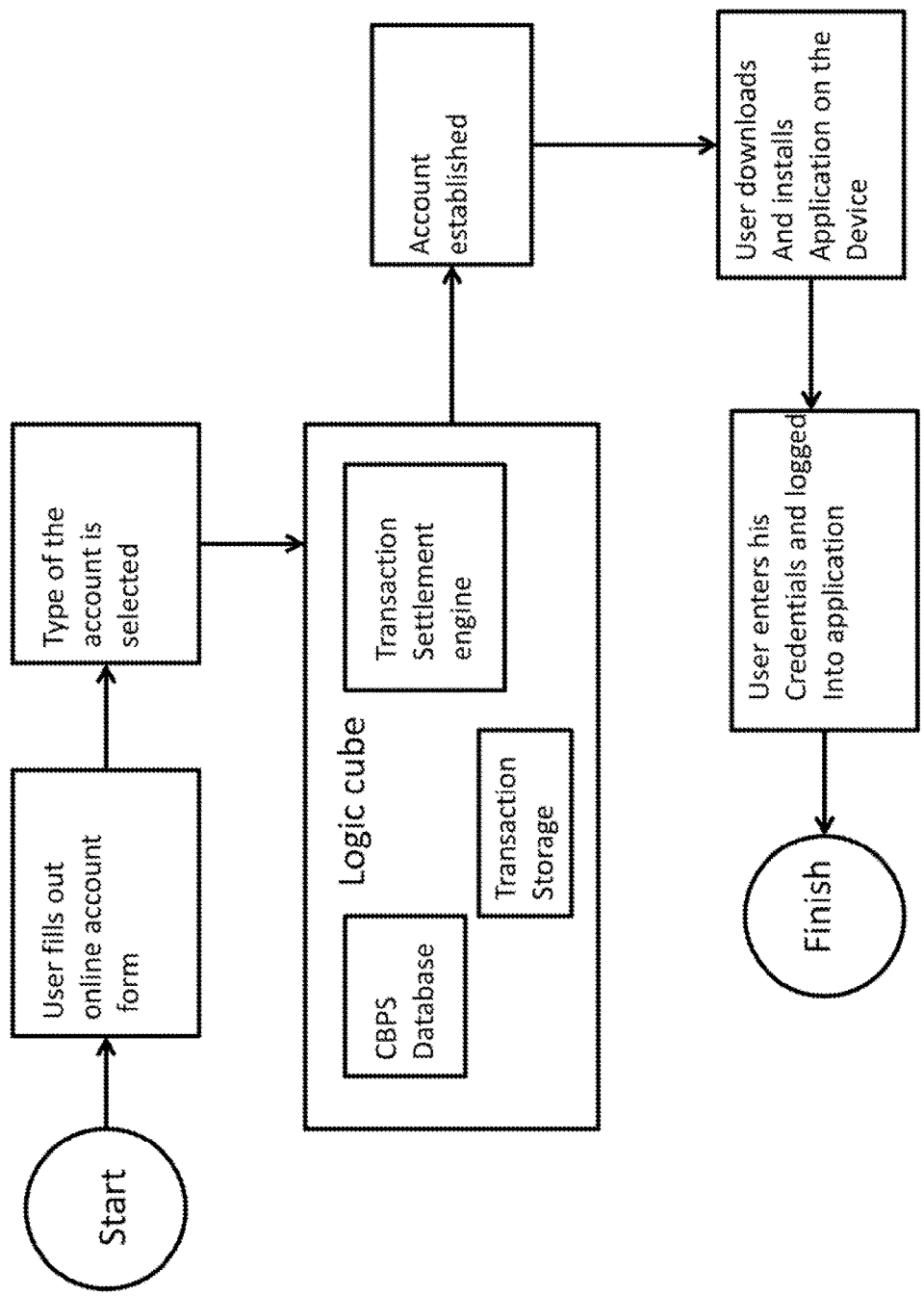
FIG. 2 shows an example of a process for establishing a transaction code payment account in accordance with some embodiments of the disclosed subject matter.

In some embodiments, as illustrated in FIG. 2, the account application form can provide the user with information about multiple types of TCP accounts, such as credit accounts, debit accounts, prepaid accounts, etc. In some embodiments, for example, each type of the TCP accounts can provide the user with a particular settlement option. The user can then select a desired type of account that is to be established. In a more particular example, the user may establish a credit account by applying for a credit limit and accepting particular credit terms for the credit account. In some embodiments, the credit account can be associated with one or more credit cards that are possessed by the user. In another more particular example, the user may establish a debit account by providing information about one or more of the user's bank accounts and establishing direct debit functionality. In some embodiments, the debit account can be settled through Automated Clearing House (ACH) network and amounts can be directly debited from the user's bank accounts. In yet another more particular example, the user can establish a prepaid account that can allow the user to deposit funds in the user's TCP account and replenish the funds when needed. In some embodiments, the prepaid account can be linked to one or more debit cards possessed by the user.

In some embodiments, as illustrated in FIG. 2, upon the user filling out the account application form and selecting the type of the TCP account, process 100 can establish a TCP account of the desired type for the user and store the information about the user and the account in a suitable database. In response to the establishment of the account, the user can be prompted to download a transaction code payment (TCP) application on a suitable user device. In some embodiments, upon loading on the user's user device, the TCP application can prompt the user to log into the user's TCP account using the user's credentials (e.g., such as the user's user ID, password, etc.).

In some embodiments, multiple TCP accounts can be established for multiple users, respectively. For example, a TCP account can be established for each of a merchant user and a customer user, respectively. The merchant user can be any user that is capable of providing goods, services, etc. and receiving a payment from another user, such as a business, a consumer, a government, etc. The customer user can be any user that is capable of making payments and receiving goods, services, etc., such as a business, a consumer, a government, etc. In some embodiments, upon establishing an account for each of the merchant user and the customer user, each of the merchant user and the customer user can be prompted to download a transaction code payment (TCP) application on a suitable user device.

Figure 3:
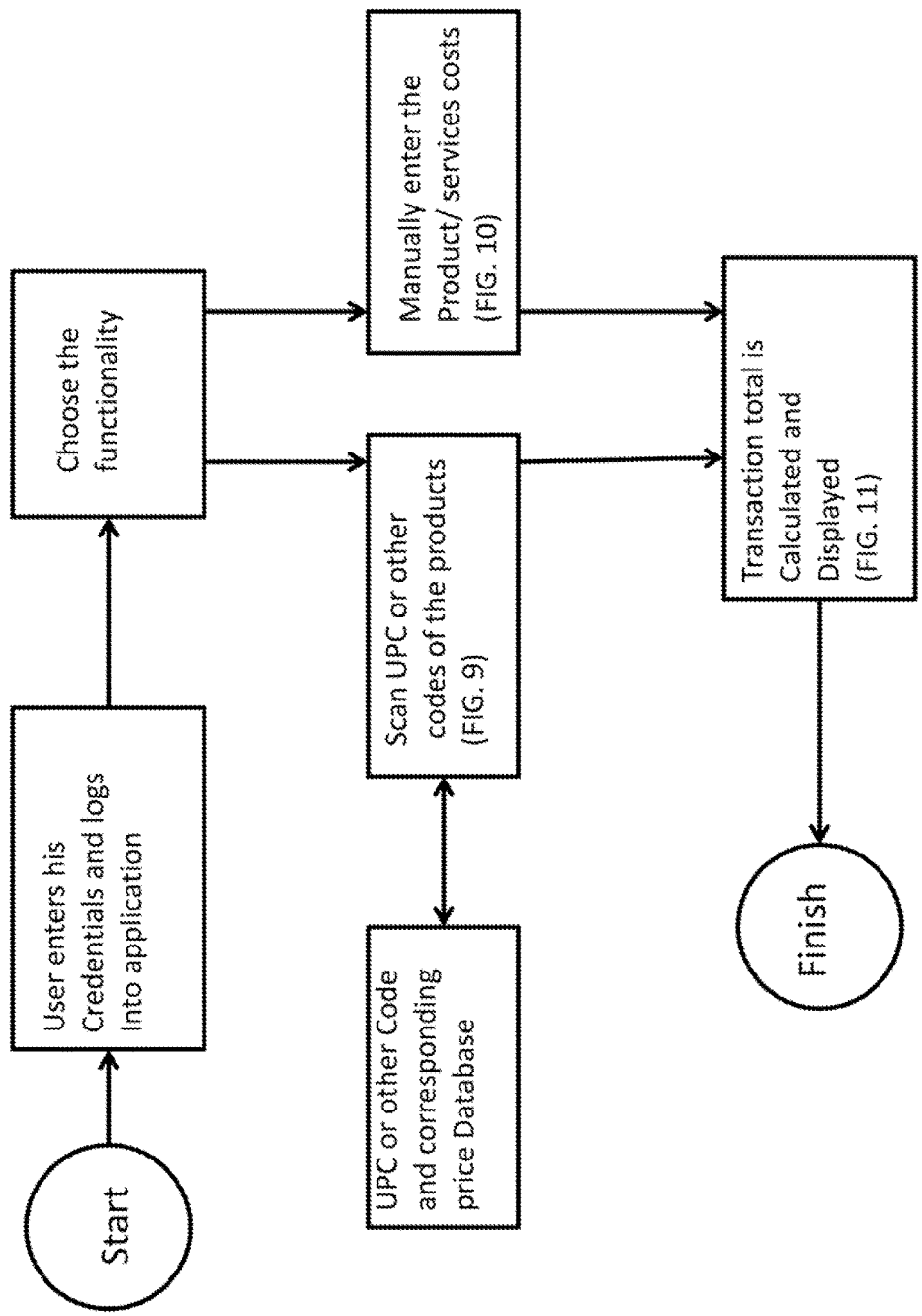
FIG. 3 shows an example of a process for initiating a transaction in accordance with some embodiments of the disclosed subject matter.

Referring back to FIG. 1, at 104, process 100 can cause a transaction to be initiated by a first user. The transaction can be of any suitable type, such as B2B, B2C, C2C, etc. The transaction can involve any suitable trade items, such as products, services, money transfers, etc. The transaction can be initiated in any suitable manner. For example, in some embodiments, the transaction can be initiated by a merchant user. More particularly, for example, as illustrated in FIG. 3, in response to loading on the merchant user's user device, the TCP application can allow the merchant user to enter the merchant user's credentials (e.g., such as the merchant user's user ID, password, etc.) and log into the merchant user's TCP account. The TCP application can then prompt the merchant user to select a method for providing information about one or more trade items (e.g., such as products, services, money transfers, or any suitable subject matter of the transaction) involved in the transaction to be initiated. For example, the TCP application can allow the merchant user to provide information about a trade item by scanning a barcode (e.g., such as a one-dimensional barcode, a two-dimensional barcode, a Universal Product Code (UPC), a quick response (QR) code, or any suitable machine-readable code that can be read, scanned, and/or processed by an optical sensor) associated with the trade item, manually entering information about the trade item, etc. As another example, the TCP application can allow the user to enter a combination of numbers, letters, symbols, etc. corresponding to the barcode associated with the trade item. As yet another example, the TCP application can allow the user to enter information about the trade item (e.g., the price of the trade item, the description of the trade item, etc.) using a suitable user device.

Figure 9:
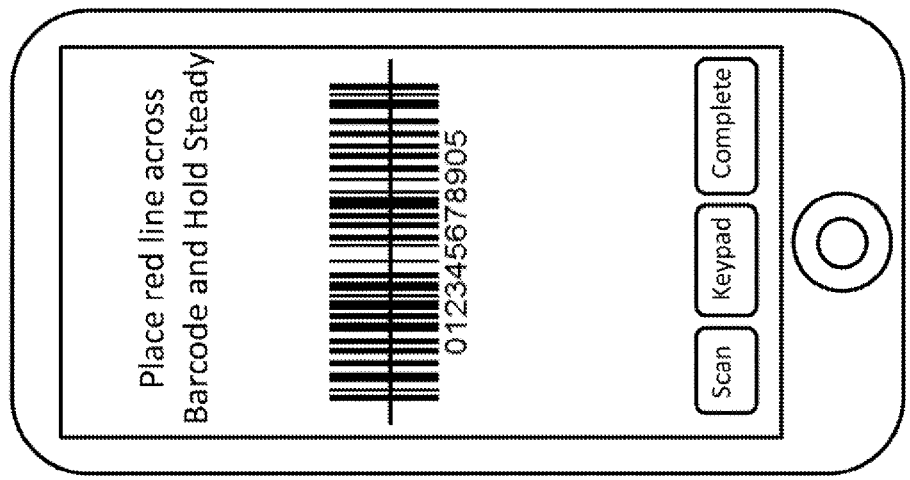
FIG. 9 shows an example of an interface for prompting a user to scan a barcode associated with a trade item using a user device in accordance with some embodiments of the disclosed subject matter.

In some embodiments, in response to the merchant user selecting scanning the barcode associated with the trade item, the TCP application can present a suitable interface to the merchant user to allow the merchant user to scan the barcode associated with the trade item. For example, as shown in FIG. 9, an interface 900 can be presented to the merchant user to prompt the merchant user to scan a barcode associated with a trade item using a user device. Upon the merchant user scanning the barcode, the application can process the barcode and retrieve information about the trade item from a database based on the processed barcode. The information about the trade item can include, for example, the type of the trade item (e.g., such as goods, services, money transfers, etc.), the price of the trade item, the description of the trade item, etc.

Figure 10:
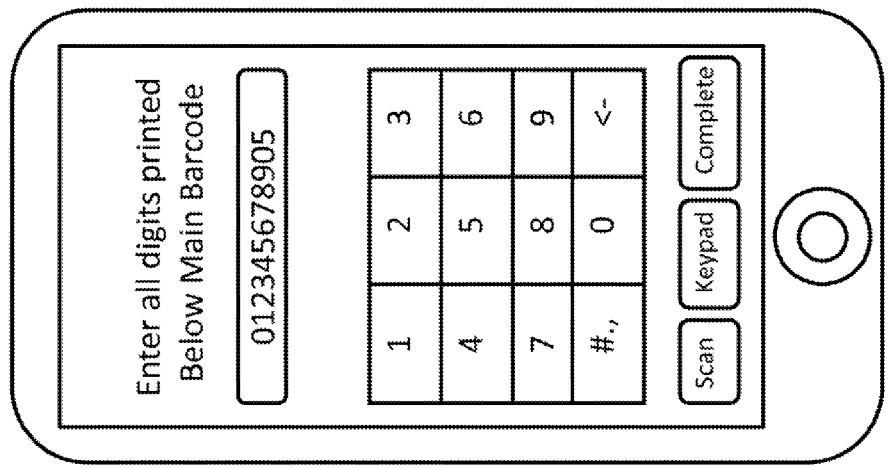
FIG. 10 shows an example of an interface for entering information about a trade item in accordance with some embodiments of the disclosed subject matter.

In some embodiments, in response to the merchant user selecting to manually enter the information about a trade item, the TCP application can present a suitable interface to the merchant user to allow the merchant user to manually enter information about the trade item. For example, as illustrated in FIG. 10, an interface 1000 can be presented to the merchant user. As shown, interface 1000 can prompt the merchant user to enter a combination of numbers, letters, symbols, etc. corresponding to the barcode associated with the trade item (e.g., all the digits printed below the barcode). The user can then enter the combination corresponding to the barcode associated with the trade item using the keypad on interface 1000. In response to the merchant user entering the combination, the TCP application can retrieve information about the trade item from a database, such as the type of the trade item (e.g., such as goods, services, money transfers, etc.), the price of the trade item, the description of the trade item, etc. In some embodiments, the application can allow the merchant user to manually enter the aforementioned information about the trade item using the keypad on interface 1000.

Figure 11:
FIG. 11 shows an example of an interface for presenting information about a transaction in accordance with some embodiments of the disclosed subject matter.
Figure 12:
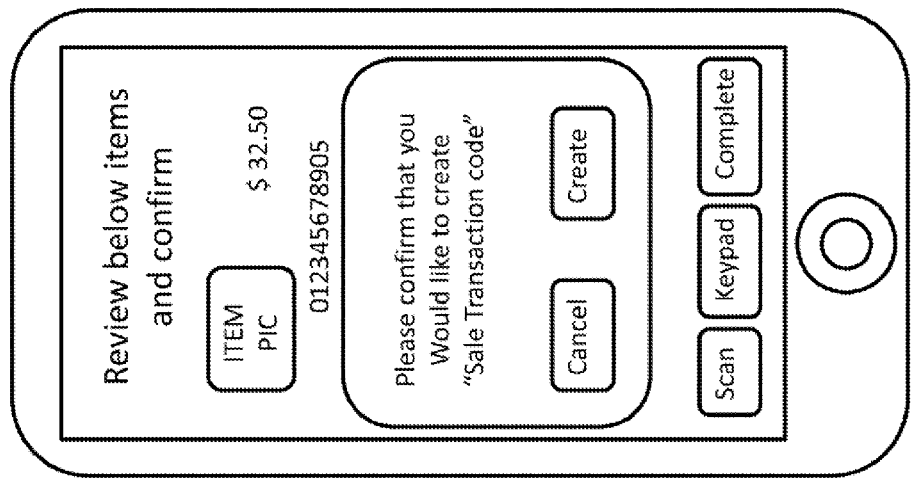
FIG. 12 shows an example of an interface for prompting a user to create a sale transaction code in accordance with some embodiments of the disclosed subject matter.

In some embodiments, the TCP application can allow the merchant user to provide information about multiple trade items by scanning the barcodes associated with the trade items and/or manually entering information about the trade items. Upon obtaining information about the one or more trade items, the application can calculate a transaction total based on the information about the trade items. In addition, the application can cause the transaction total and other information about the transaction (e.g., such as the information about the trade items) to be presented to the merchant user. The information about the transaction can be presented to the merchant user in any suitable manner. For example, as illustrated in FIG. 11, an interface 1100 can be presented to the merchant user to allow the merchant user to browse information about the transaction. As shown, interface 1100 can present to the merchant user information about the trade items, such as the combination of numbers, letters, symbols, etc. corresponding to the barcode of a trade item, a description of a trade item, a price of a trade item, the total amount of the transaction, and any other suitable information about the transaction. In some embodiments, after browsing the information about the transaction, the merchant user can confirm the information about the transaction and initiate the transaction by selecting a "complete" button on interface 1100.

Figure 4:
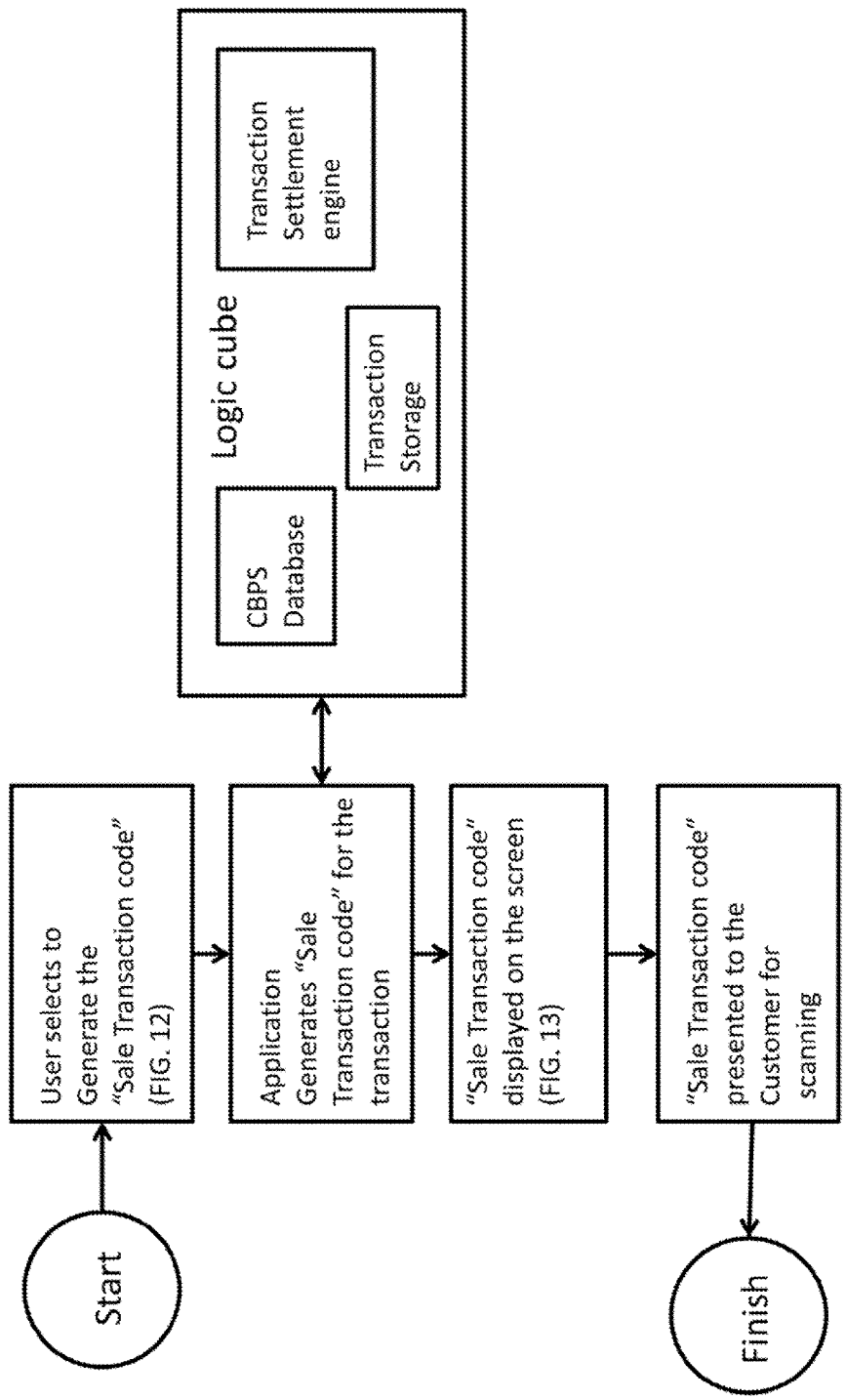
FIG. 4 shows an example of a process for generating a sale transaction code in accordance with some embodiments of the disclosed subject matter.

Referring back to FIG. 1, at 106, process 100 can generate a sale transaction code for the transaction. The sale transaction code can be generated in any suitable manner. For example, as illustrated in FIG. 4, a suitable interface can be presented to the merchant user to allow the merchant user to confirm that a sale transaction code should be generated for the transaction. More particularly, for example, an interface 1200 of FIG. 12 can be presented to the merchant user in response to the merchant user confirming the information about the transaction (e.g., by selecting the "complete" button on interface 1100). As shown, interface 1200 can prompt the merchant user to confirm that the merchant user would like to create a sale transaction code for the transaction. The merchant user can then initiate the creation of a sale transaction code by selecting a "create" button or cancel the transaction by selecting a "cancel" button on interface 1200.

In some embodiments, as illustrated in FIG. 4, in response to the merchant user confirming that a sale transaction code should be generated for the transaction, the application can generate a sale transaction code for the transaction. The sale transaction code can include any suitable information about the transaction. For example, the sale transaction code can include information about a user ID, a transaction amount, a date/time stamp, etc. In some embodiments, the user ID can be generated by the merchant user's user device and can comprise information about the merchant user's TCP account (e.g., such as the type of the account, the merchant user's credentials, etc.), the merchant user's user device (e.g., such as information about the hardware of the merchant user's user device), and/or any other suitable information. In some embodiments, the transaction amount can be the total amount of the transaction. In some embodiments, the date/time stamp can be a dynamic stamp that can expire in a predetermined period of time. More particularly, for example, the dynamic stamp can include a countdown timer that can measure 30-60 seconds. In some embodiments, for example, the sale transaction code can be valid for the predetermined period of time (e.g., 30-60 seconds or any suitable period of time).

Figure 13:
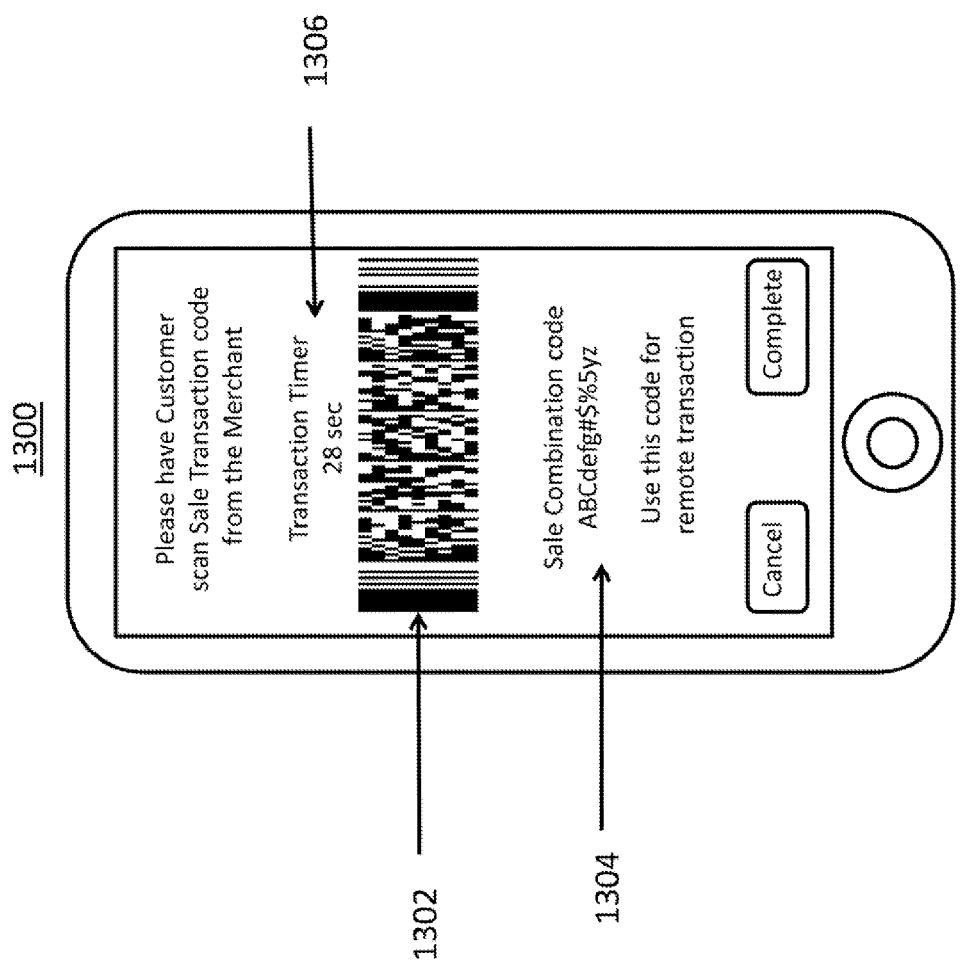
FIG. 13 shows an example of an interface for displaying sale transaction codes in accordance with some embodiments of the disclosed subject matter.

In some embodiments, as illustrated in FIG. 4, the sale transaction code can be of any suitable type. For example, the application can generate a sale barcode that can be read, scanned, and/or processed by a suitable optical sensor, such as a one-dimensional barcode, a two-dimensional barcode, a UPC, a QR code, etc. In a more particular example, as illustrated in FIG. 13, a sale barcode 1302 can be generated and displayed. As another example, the sale transaction code can be a combination code that can be any suitable combination of letters, numbers, symbols, etc., associated with a trade item. In a more particular example, as shown in FIG. 13, a sale combination code 1304 can be generated and displayed.

In some embodiments, the TCP application can generate multiple types of sale transaction codes for a given transaction. For example, a sale barcode and a sale combination code can be generated for the transaction. In some embodiments, as illustrated in FIG. 4, upon generating one or multiple sale transaction codes for the transaction, the TCP application can cause the sale transaction codes to be displayed on the merchant user's user device using a suitable interface. For example, as illustrated in FIG. 13, an interface 1300 can be presented to the merchant user on the merchant user's user device. As shown, interface 1300 can include a sale barcode 1302 and a sale combination code 1304. Interface 1300 can also include a transaction timer 1306 that can measure a predetermined period of time (e.g., 30-60 seconds or any suitable period of time). In some embodiments, a transaction can be initiated upon the generation of the one or more sale transaction codes. The transaction can be valid until the predetermined period of time expires or a second user verifies the transaction as discussed in more detail below.

In some embodiments, in addition to presenting the sale transaction code to the merchant user, the application can cause the one or more sale transaction codes to be presented to one or more additional users, such as one or more merchant users, customer users, etc. The sale transaction codes can be presented to the additional users in any suitable manner. For example, a sale barcode can be presented to a customer user on a suitable user device, such as the merchant user's user device, the customer user's user device, etc. As another example, a sale combination code can be transmitted to the customer user and displayed on the customer user's user device through a suitable communications network, such as a telephone network, Internet, etc.

Figure 5:
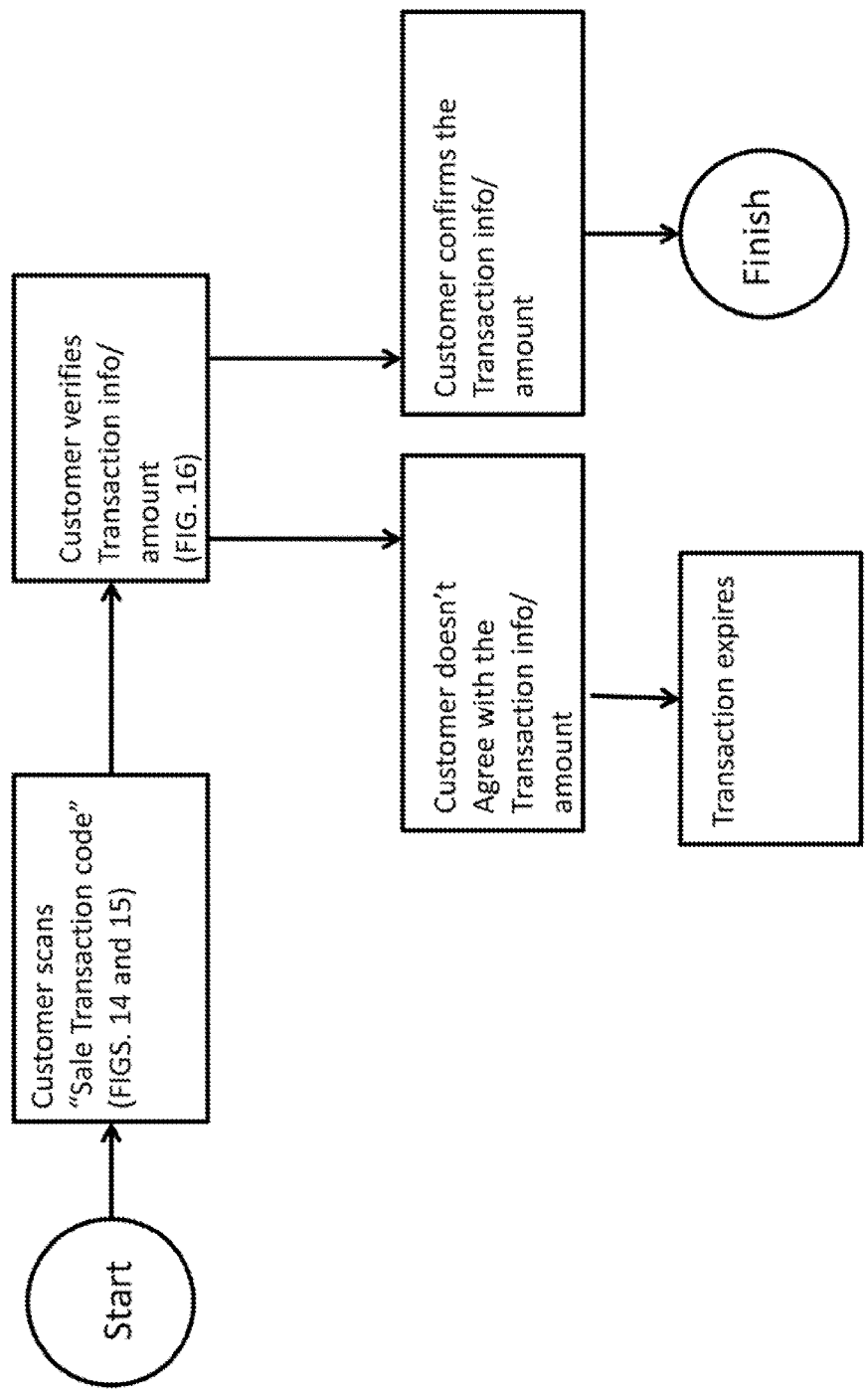
FIG. 5 shows an example of a process for verifying a transaction in accordance with some embodiments of the disclosed subject matter.
Figure 14:
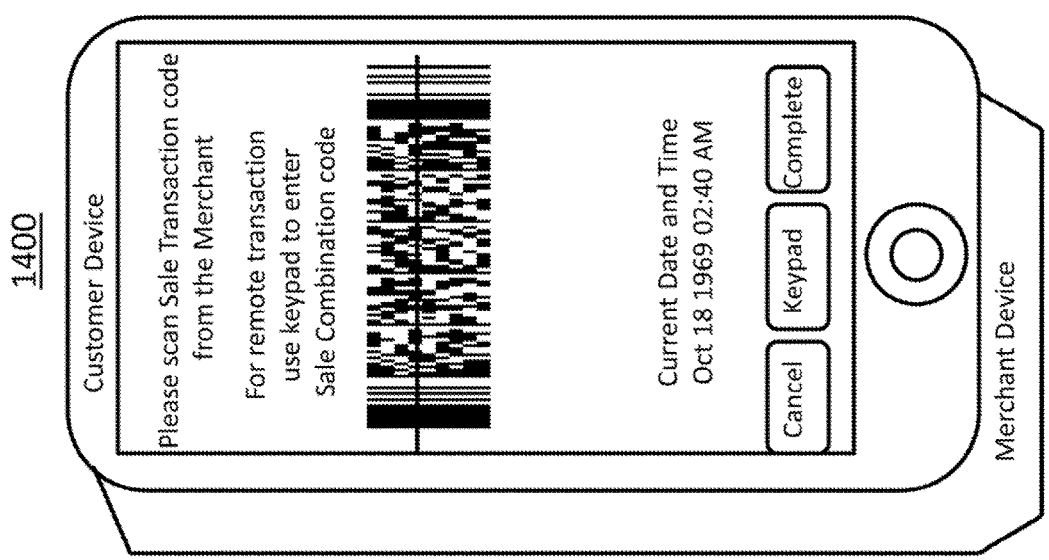
FIG. 14 shows an example of an interface for prompting a user to scan a sale barcode in accordance with some embodiments of the disclosed subject matter.
Figure 15:
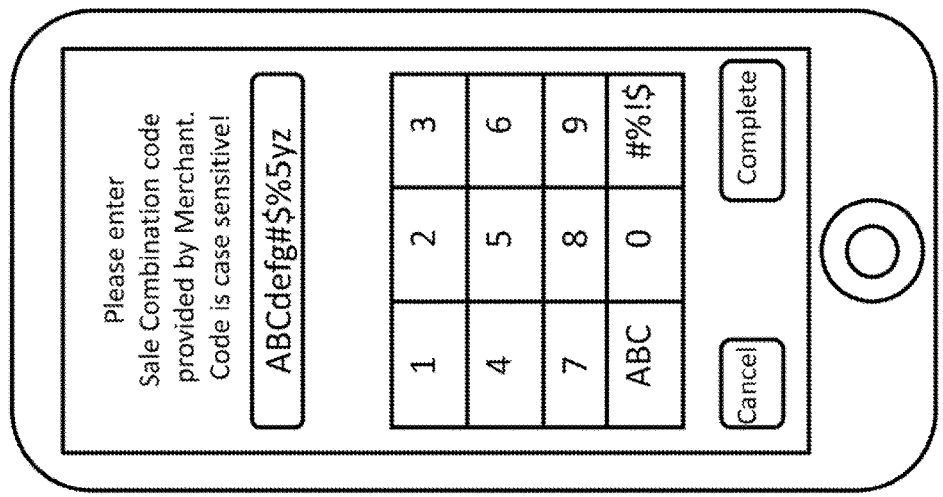
FIG. 15 shows an example of an interface for prompting a user to enter a sale combination code in accordance with some embodiments of the disclosed subject matter.

Referring back to FIG. 1, at 108, process 100 can prompt a second user to verify the transaction. The second user can be any suitable user. In some embodiments, for example, the second user can be a customer user. The second user can be prompted to verify the transaction in any suitable manner. For example, in some embodiments, in response to loading on the customer's user device, the TCP application can allow the customer user to enter the customer user's credentials (e.g., such as the customer user's user ID, password, etc.). In some embodiments, as illustrated in FIG. 5, the TCP application can then allow the customer user to browse information about the transaction by scanning a sale barcode, entering a sale combination code and/or in any other suitable manner. In a more particular example, as illustrated in FIG. 14, the TCP application can present an interface 1400 to the customer user and prompt the customer user to scan a sale barcode being displayed on the merchant user's user device. In another more particular example, as illustrated in FIG. 15, the TCP application can present an interface 1500 to the customer user and prompt the customer user to enter the sale combination code provided by the merchant user.

Figure 16:
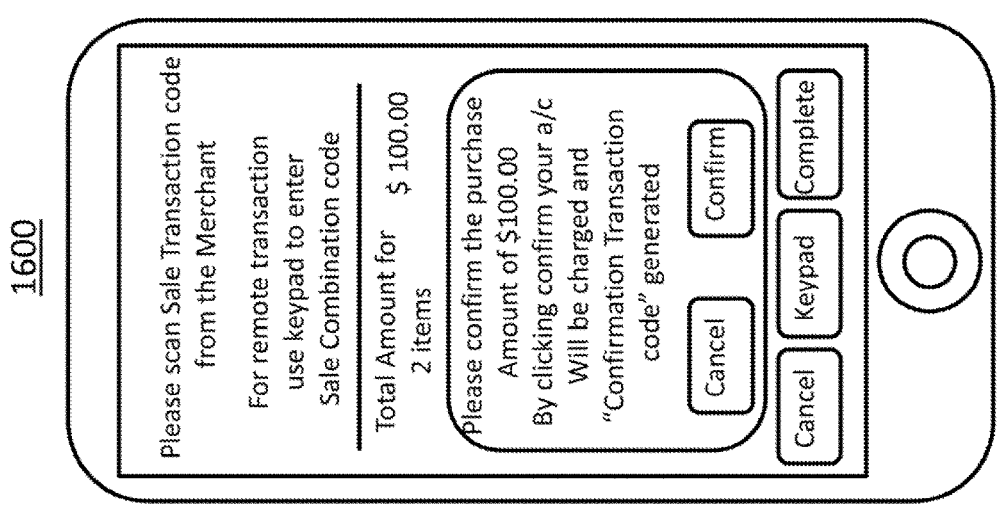
FIG. 16 shows an example of an interface that can be presented to a user to allow the user to view and verify details about a transaction in accordance with some embodiments of the disclosed subject matter.

In some embodiments, as illustrated in FIG. 5, upon the customer user scanning the sale barcode or entering the sale combination code, the TCP application can request the customer user to verify details about the transaction, such as the total amount, the number of trade items, and any other suitable information about the transaction. The customer user can verify the details about the transaction in any suitable manner. For example, as illustrated in FIG. 16, an interface 1600 can be presented to the customer user to allow the customer user to view and verify details about the transaction. As shown, interface 1600 can include the total amount of the transaction, the number of trade items, the price of each trade item, and any other suitable information about the transaction. Interface 1600 can also prompt the customer user to verify the presented information about the transaction and confirm that the customer user's account will be charged for the total amount of the transaction. In some embodiments, the customer user can select a "confirm" button on interface 1600 to confirm that the customer user's account will be charged for the total amount of the transaction and a confirmation transaction code will be generated. In some embodiments, the customer user can select a "cancel" button of interface 1600 to cancel the transaction.

Figure 6:
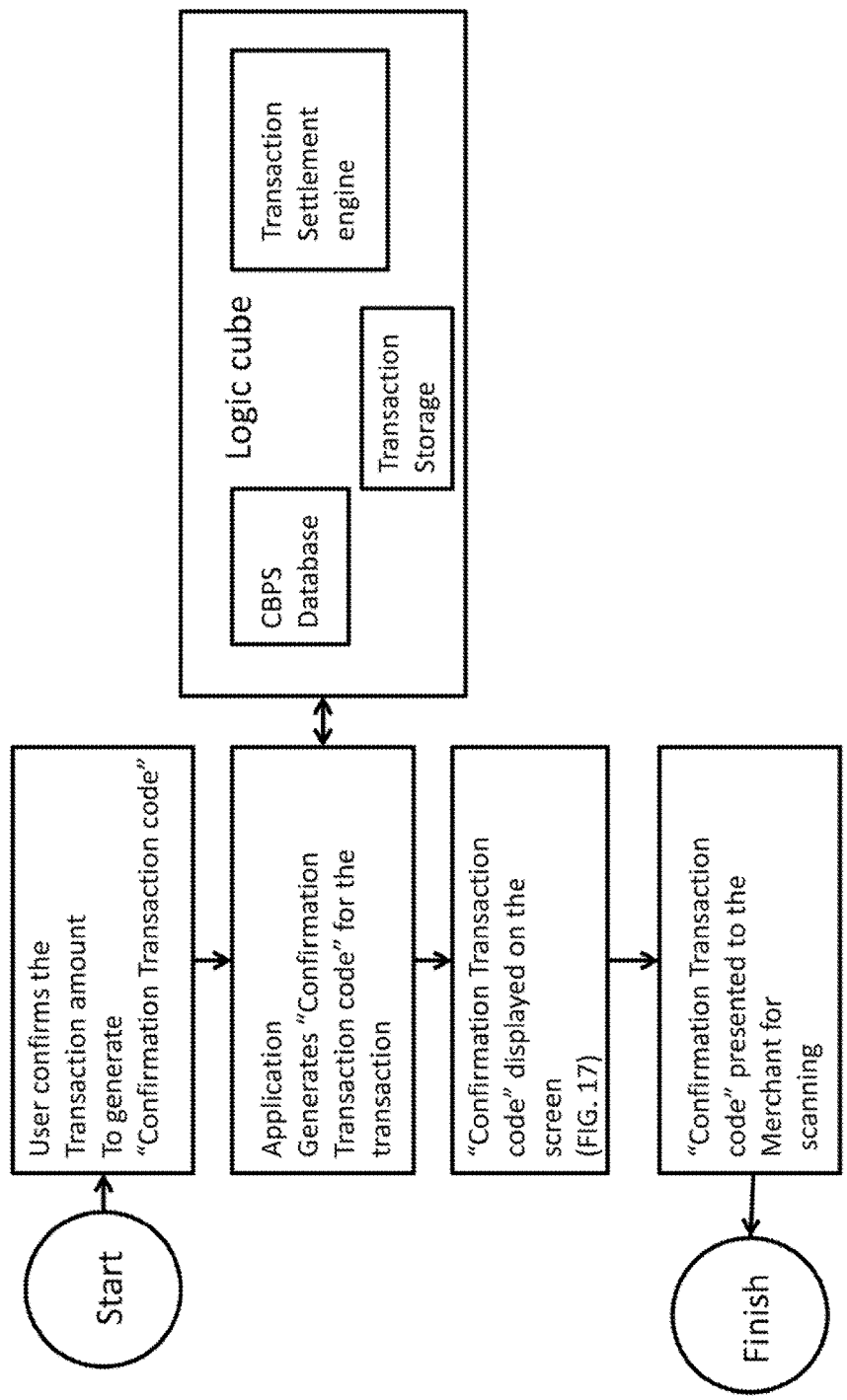
FIG. 6 shows an example of a process for generating a confirmation transaction code in accordance with some embodiments of the disclosed subject matter.

Referring back to FIG. 1, at 110, process 100 can generate a confirmation transaction code. The confirmation transaction code can be generated in any suitable manner. For example, as illustrated in FIG. 6, in response to the customer user confirming the transaction amount, the TCP application can generate a confirmation transaction code for the transaction. The confirmation transaction code can include any suitable information about the customer user, the merchant user, and/or the transaction. For example, the confirmation transaction code can include a user ID, a transaction amount, a date/time stamp, etc. In some embodiments, the user ID can be generated by the customer user's user device and can comprise information about the customer user's account (e.g., such as the type of the account, the user's credentials, etc.) and the customer user's user device (e.g., such as hardware information). In some embodiments, the transaction amount can be the total amount of the transaction. In some embodiments, the date/time stamp can be a dynamic stamp that expires in a predetermined period of time (e.g., 30-60 seconds or any suitable period of time). In some embodiments, the dynamic date/time stamp can be carried from and continue to countdown from the sale transaction code. In some embodiments, for example, the confirmation transaction code can be valid for the predetermined period of time.

The confirmation transaction code can be of any suitable type. For example, the confirmation transaction code can be a barcode that can be read, scanned, and/or processed using a suitable optical device, such as a one-dimensional barcode, a two-dimensional barcode, a UPC, a QR code, etc. As another example, the confirmation transaction code can be a combination code that can include a suitable combination of letters, numbers, symbols, etc. In some embodiments, the customer application can generate multiple confirmation transaction codes that are of same or different types. For example, the application can generate a confirmation transaction code, a confirmation combination code, etc. for a given transaction. In some embodiments, the application can store the one or more confirmation transaction codes in a suitable database. In some embodiments, the TCP application can confirm funds availability from the customer user's TCP account and reserve the amount necessary to complete the transaction.

Figure 17:
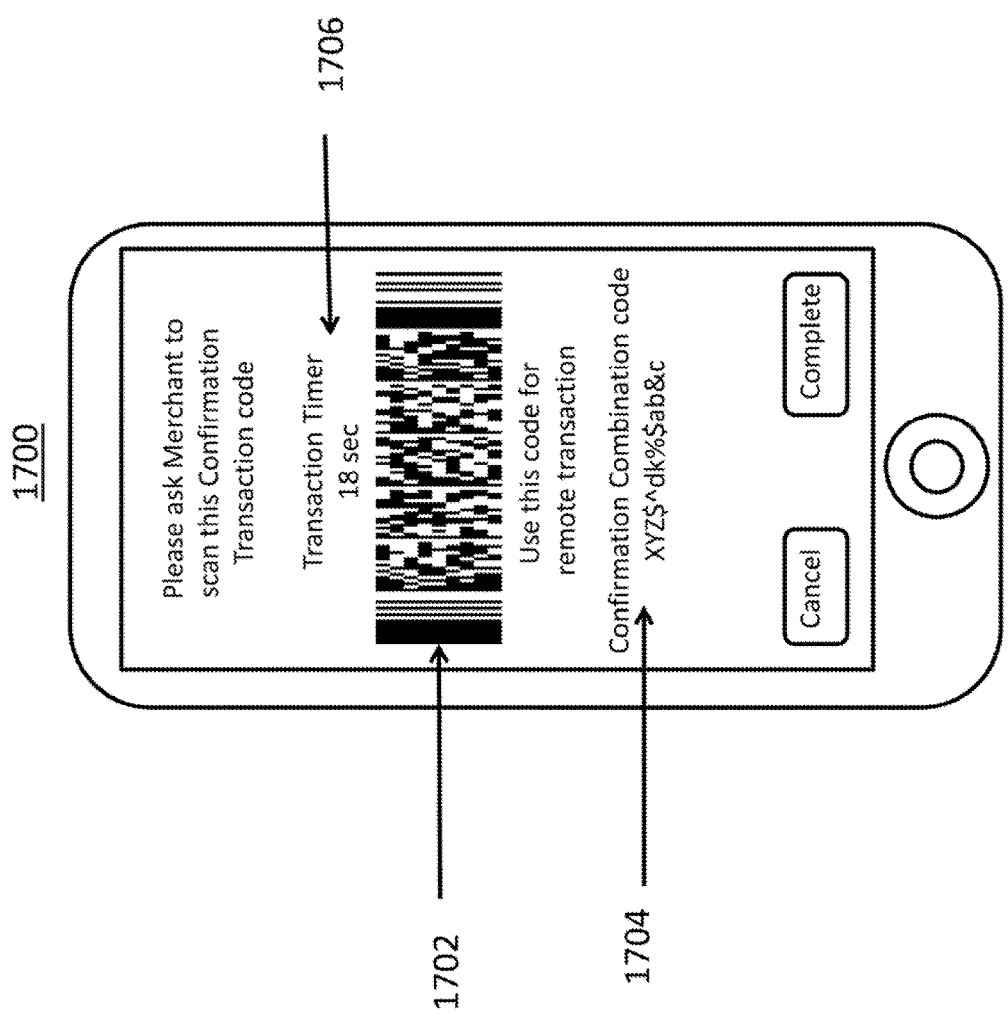
FIG. 17 shows an example of an interface for displaying confirmation transaction codes in accordance with some embodiments of the disclosed subject matter.

In some embodiments, as illustrated in FIG. 6, upon generating one or multiple confirmation transaction codes, the application can cause the confirmation transaction codes to be displayed on a suitable user device. For example, as shown in FIG. 17, an interface 1700 can be presented to the customer user on the customer user's user device. As shown, interface 1700 can include a confirmation transaction code 1702 and a confirmation combination code 1704. Interface 1700 can also include a transaction timer 1706 that can measure a predetermined period of time (e.g., 30-60 seconds or any suitable period of time). In some embodiments, the one or more confirmation transaction codes can be valid for the predetermined period of time or upon the first user (e.g., the merchant user) verifying the transaction as discussed in more detail below.

Figure 7:
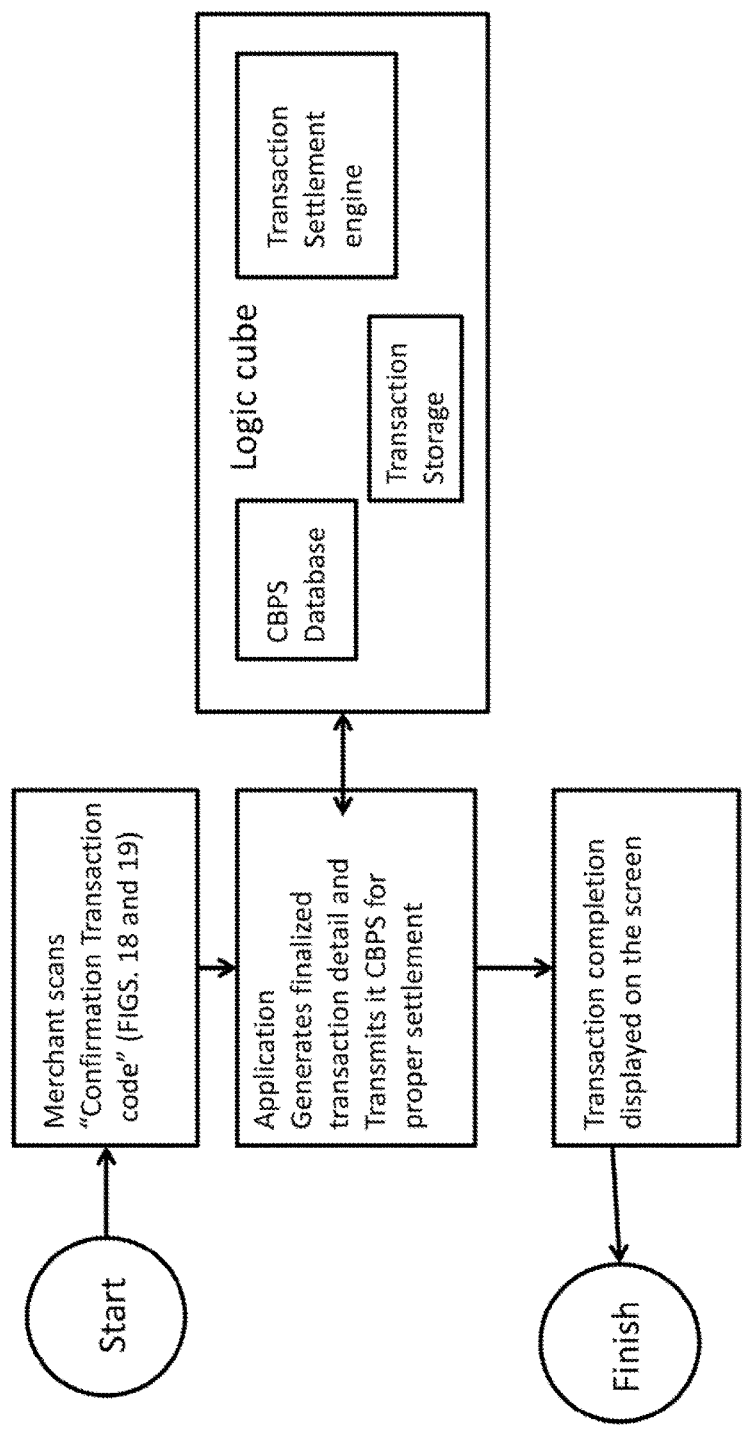
FIG. 7 shows an example of a process for finalizing a transaction in accordance with some embodiments of the disclosed subject matter.
Figure 18:
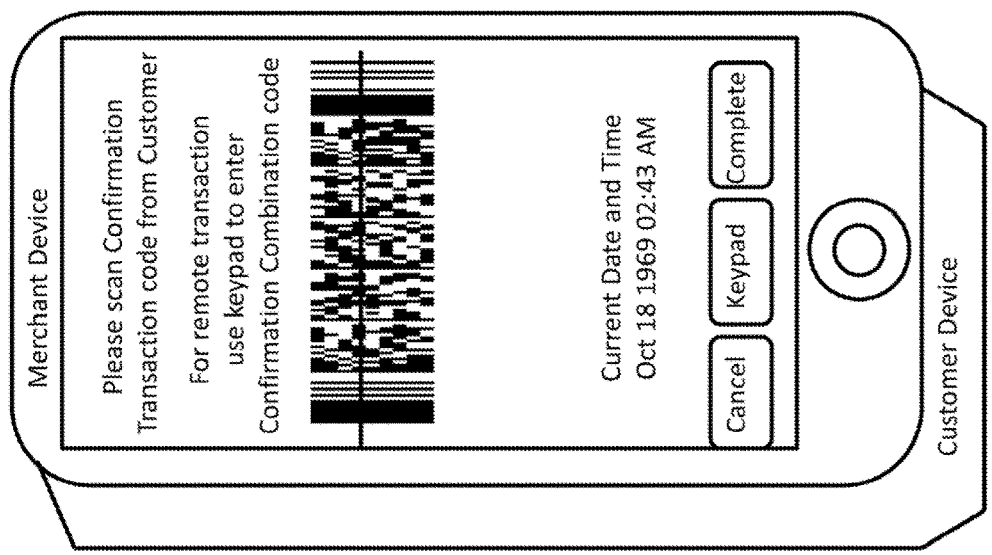
FIG. 18 shows an example of an interface for prompting a user to scan a confirmation transaction code in accordance with some embodiments of the disclosed subject matter.
Figure 19:
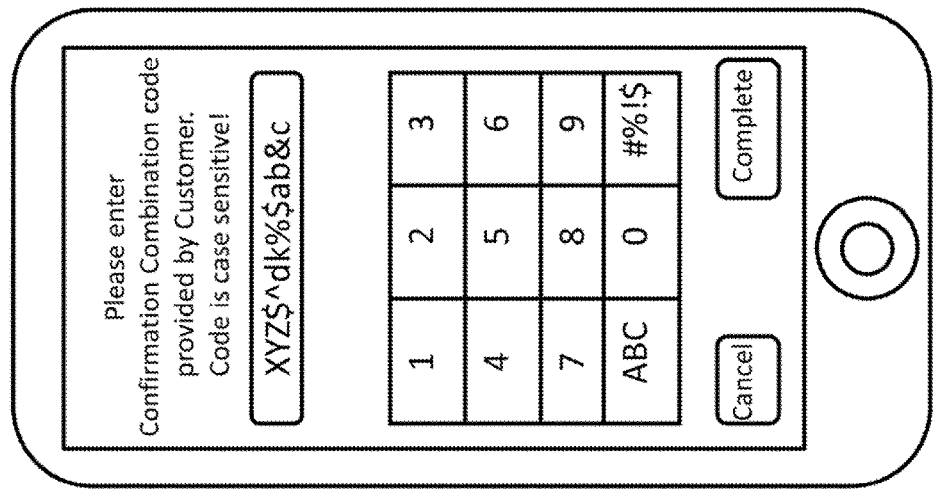
FIG. 19 shows an example of an interface for prompting a user to enter a confirmation combination code in accordance with some embodiments of the disclosed subject matter.

Referring back to FIG. 1, at 112, process 100 can prompt the first user to verify the transaction. The first user can be prompted to confirm the transaction in any suitable manner. For example, as illustrated in FIG. 7, the TCP application can allow the merchant user to browse information about the transaction by scanning a confirmation transaction code, entering a confirmation combination code, or in any suitable manner. In a more particular example, as illustrated in FIG. 18, the TCP application can present an interface 1800 to the merchant user and prompt the merchant user to scan a confirmation transaction code being displayed on the customer user's user device. In another more particular example, as shown in FIG. 19, the TCP application can present an interface 1900 to the customer user and prompt the customer user to enter the confirmation combination code provided by the customer user.

In some embodiments, as illustrated in FIG. 7, in response to the merchant user scanning the confirmation barcode and/or entering the confirmation combination code, the TCP application can generate finalized transaction details and transmit the transaction details to a server for proper settlement. In some embodiments, for example, the transaction details can be transmitted from the merchant user's user device and/or the customer user's user device to a server through a suitable communications network. In some embodiments, upon transmitting the transaction details, the TCP application can cause a message indicating that the transaction is completed to be displayed on the merchant user's user device and/or the customer user's user device.

Figure 8:
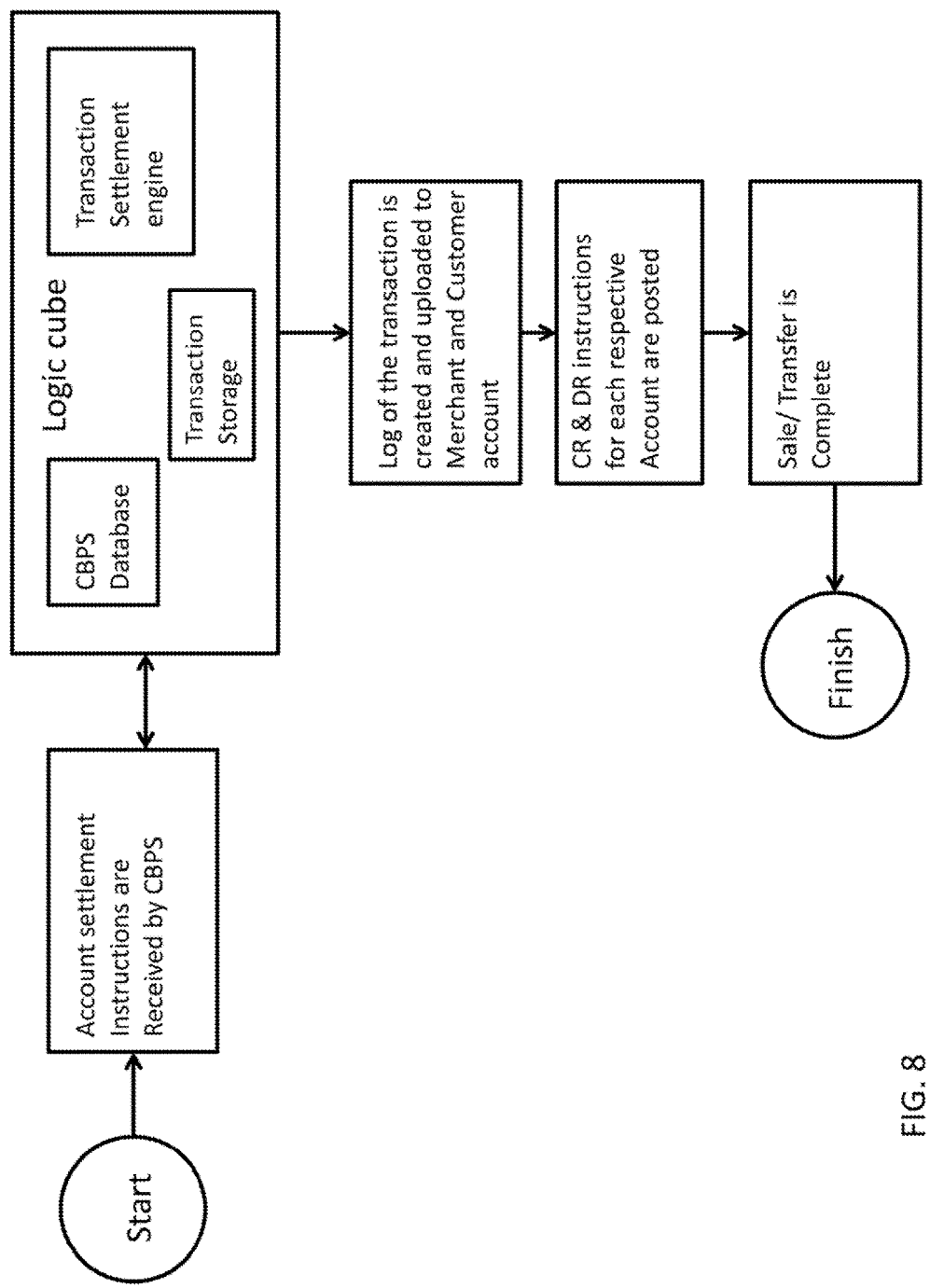
FIG. 8 shows an example of a process for settling a transaction in accordance with some embodiments of the disclosed subject matter.

Referring back to FIG. 1, at 114, process 100 can settle the transaction. The transaction can be settled in any suitable manner. For example, as illustrated in FIG. 8, in response to receiving the finalized transaction details from the merchant user's user device and/or the customer user's user device, process 100 can retrieve information about the merchant user's TCP account, information about the customer user's TCP account, information about the transaction, and/or any other suitable information. In some embodiments, for example, a log of the transaction can be created and uploaded to the merchant user's TCP account and/or the customer user's TCP account. In some embodiments, credit and/or debit instructions can be posted for the merchant user's TCP account and the customer user's TCP account, respectively. In some embodiments, the system can enable proper netting of the merchant user's TCP account and/or the customer user's TCP account.

Turning to FIG. 20, a generalized block diagram of an example 2000 of a system for conducting transactions using transaction codes in accordance with some implementations of the disclosed subject matter is shown. As illustrated, system 2000 can include one or more servers 2002, a communications network 2004, one or more user devices 2006, and communication links 2012 and 2014. In some embodiments, one or more portions of, or all of, process 100 as illustrated in FIGS. 1-8, and one or more of the interfaces illustrated in FIGS. 9-19, can be implemented by server(s) 2002 and/or user devices 2006.

Server(s) 2002 can be any suitable server for conducting transactions using transaction codes, for performing one or more portions of the processes illustrated in FIGS. 1-8, and/or for performing any other suitable function. Server(s) 2002 can include and/or be any of a general purpose device such as a computer or a special purpose device such as a client, a server, etc. Any of these general or special purpose devices can include any suitable components, such as a hardware processor (which can be a microprocessor, a digital signal process, a controller, etc.), memory, communication interfaces, display controllers, input devices, etc. For example, each of the server(s) 2002 can be implemented as a computer, a tablet computing device, a multimedia terminal, a mobile telephone, a gaming device, a data processing device, etc., or a combination of such devices.

User devices 2006 can include a mobile phone, a tablet computer, a laptop computer, a desktop computer, a personal data assistant (PDA), a portable email device, a gaming device, a point of sale system (e.g., a cash register), and/or any other suitable device. In some embodiments, as illustrated in FIG. 20, a user device 2006 can include an optical sensor 2008, a hardware processor 2010, and any other suitable components (e.g., such as memory, communication interfaces, display controllers, input devices, etc.). Optical sensor 2008 can be any suitable sensor that is capable of reading and/or scanning a barcode, such as a camera, a scanner, a barcode reader, etc. Processor 2010 can be any suitable hardware processor, such as a microprocessor, a digital signal processor, a controller, etc.

Although two user devices 2006 are shown in FIG. 20 to avoid over-complicating the drawing, any suitable number of these devices, and suitable types of these devices, can be used in some implementations.

Each of user devices 2006 and server(s) 2002 can comprise a storage device, which can include a hard drive, a solid state storage device, a removable storage device, and/or any other suitable storage device. Server(s) 2002, user devices 2006, optical sensor(s) 2008, and processor(s) 2010 can be located at any suitable location. Each of server(s) 2002, user devices 2006, optical sensor(s) 2008, and processor(s) 2010 can be implemented as a stand-alone device or integrated with other components of system 2000.

Communications network 2004 can be any suitable computer network such as the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"), a satellite network, a mobile phone network, a mobile data network, a cable network, a telephone network, a fiber optic network, and/or any other suitable communication network, or any combination of any of such networks.

Server(s) 2002 and user device 2006 can be connected to communications network 2004 through communication links 2012 and 2014, respectively. Communication links 2012 and 2014 can be any suitable communication links, such as network links, dial-up links, wireless links, hardwired links, any other suitable communication links, or a combination of such links.

In some implementations, any suitable computer readable media can be used for storing instructions for performing the processes described herein. For example, in some implementations, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media for conducting transactions using transaction codes are provided.

The provision of the examples described herein (as well as clauses phrased as "such as," "e.g.," "including," and the like) should not be interpreted as limiting the claimed subject matter to the specific examples; rather, the examples are intended to illustrate only some of many possible aspects.

Although the disclosed subject matter has been described and illustrated in the foregoing illustrative implementations, it is understood that the present disclosure has been made only by way of example, and that numerous changes in the details of implementation of the disclosed subject matter can be made without departing from the spirit and scope of the disclosed subject matter. Features of the disclosed implementations can be combined and rearranged in various ways.

What is claimed is:

1. A method for conducting a transaction using transaction codes, the method comprising:
    obtaining information about a trade item associated with the transaction by a first mobile phone;
    generating a sale transaction code using a first mobile phone, wherein the sale transaction code includes the information about the trade item and information about a first user account associated with the first mobile phone;
    displaying the sale transaction code on the first mobile phone;
    receiving a first input of the sale transaction code on a second mobile phone;
    generating a confirmation transaction code on the second mobile phone in response to receiving the first input at the second mobile phone, wherein the confirmation transaction code includes information about a second user account associated with the second mobile phone;
    displaying the confirmation transaction code on the second mobile phone;
    receiving a second input of the confirmation transaction code on the first mobile phone;
    generating transaction details on the first mobile phone in response to receiving the second input at the first mobile phone; and
    transmitting the transaction details from the first mobile phone to a server for settlement in response to receiving the second input at the first mobile phone.

2. The method of claim 1, wherein obtaining information about a trade item includes scanning a bar code of the trade item.

3. The method of claim 1, wherein displaying the sale transaction code on the first mobile phone comprises displaying a bar code.

4. The method of claim 3, wherein receiving the first input of the sale transaction code comprises on the second mobile phone comprises scanning the sale transaction code as displayed on the first mobile phone by the second mobile phone.

5. The method of claim 1, wherein displaying the confirmation transaction code on the second mobile phone comprises displaying a bar code.

6. The method of claim 5, wherein receiving the second input of the confirmation transaction code on the first mobile phone comprises scanning the confirmation transaction code as displayed on the second mobile phone by the first mobile phone.

7. A system for conducting a transaction using transaction codes, the system comprising:
    a first mobile phone that is configured to:
        obtain information about a trade item associated with the transaction;
        generate a sale transaction code, wherein the sale transaction code includes the information about the trade item and information about a first user account associated with the first mobile phone;
        display the sale transaction code on the first mobile phone; and
    a second mobile phone that is configured to:
        receive a first input of the sale transaction code;
        generate a confirmation transaction code in response to receiving the first input at the second mobile phone, wherein the confirmation transaction code includes information about a second user account associated with the second mobile phone; and
        display the confirmation transaction code on the second mobile phone,
    wherein the first mobile phone is further configured to:
        receive a second input of the confirmation transaction code;
        generate transaction details in response to receiving the second input at the first mobile phone; and
        transmit the transaction details from the first mobile phone to a server for settlement in response to receiving the second input at the first mobile phone.

8. The system of claim 7, wherein obtaining information about a trade item includes scanning a bar code of the trade item.

9. The system of claim 7, wherein displaying the sale transaction code on the first mobile phone comprises displaying a bar code.

10. The system of claim 9, wherein receiving the first input of the sale transaction code comprises on the second mobile phone comprises scanning the sale transaction code as displayed on the first mobile phone by the second mobile phone.

11. The system of claim 7, wherein displaying the confirmation transaction code on the second mobile phone comprises displaying a bar code.

12. The system of claim 11, wherein receiving the second input of the confirmation transaction code on the first mobile phone comprises scanning the confirmation transaction code as displayed on the second mobile phone by the first mobile phone.

\* \* \* \* \*